United States Patent [19]

Machen

[11] Patent Number: 4,856,214
[45] Date of Patent: Aug. 15, 1989

[54] INFORMATION CLIP-IT

[75] Inventor: James A. Machen, Plymouth, Minn.

[73] Assignee: Jamco International, Inc., Eden Prairie, Minn.

[21] Appl. No.: 51,522

[22] Filed: Oct. 20, 1987

[51] Int. Cl.$^4$ ............................................. G09F 3/08
[52] U.S. Cl. ............................................ 40/316; 40/661
[58] Field of Search ........................... 40/316, 642, 661

[56] References Cited

U.S. PATENT DOCUMENTS

| 1,128,136 | 2/1915 | Hano | 40/661 X |
| 3,999,317 | 12/1976 | Owens | 40/642 X |
| 4,656,767 | 4/1987 | Tarrant | 40/316 |

Primary Examiner—John Fox
Attorney, Agent, or Firm—Merchant, Gould, Smith, Edell, Welter & Schmidt

[57] ABSTRACT

A dimensional advertising and instructional device designed to be attached to a universal telephone cord is provided for the purpose of advertisement and/or to provide the user with instructional or general information.

19 Claims, 3 Drawing Sheets

INFORMATION CLIP-IT

FIELD OF THE INVENTION

The present invention relates to informational devices or booklets which are used in association with apparatus provided for carrying out specific functions, preferably telephone apparatus, or the like.

BACKGROUND OF THE INVENTION

It is well known that certain information, not readily known by occasional users of apparatus provided for carrying out specific functions, is often needed by such users at the site of use. For instance, when an individual who is unfamiliar with a telephone or its particular functions, wants to use the telephone, it would be convenient for such an individual to have an informational pamphlet or the like close at hand to provide the individual with information he or she may need at the time of use in order that they may easily access the desired functions thereof. Unfortunately, such information is often unavailable when needed by the user. Even if it has been provided in a companion pamphlet or the like which is intended to be provided in a location in proximity to the apparatus, the pamphlet may be lost, removed or misplaced. Although the desired information may be readily available in such an informational pamphlet, it is of no use if the pamphlet has been lost, removed or otherwise separated from the apparatus and nowhere to be found when the information is needed by the user.

Accordingly, a need exists for an informational device or booklet which is capable of providing needed information to users of apparatus provided for carrying out specific functions. Although it is known that needed informational devices have been provided in the past, these devices are often lost or removed from the intended place of use which is a location in near proximity to the specific apparatus. The present invention provides a solution to this and other problems, and also offers other advantages over the prior art, and solves other problems associated therewith.

SUMMARY OF THE INVENTION

The original prototype was designed by James A. Machen, JAMCO International, Inc., 10300 Valley View Road, Eden Prairie, MN 55344. The Information Clip-it by JAMCO is to be marketed to telecommunication, computer and related industries for aiding enhancement in the telecommunication calling, general advertisement, instructional information, 911 emergency services, speed calling eight, and co-op advertising. The item has many universal advertising applications and was designed and developed from the period of August, 1986 to January, 1987 with a completed official prototype.

BRIEF DESCRIPTIONS OF THE DRAWINGS

In the drawings, in which like reference numerals indicate corresponding parts of preferred embodiments of the present invention throughout the several views, FIG. 1 a plan view of a plastic holder in accordance with the present invention;

DESCRIPTION OF THE PREFERRED EMBODIMENT

Figure 1:
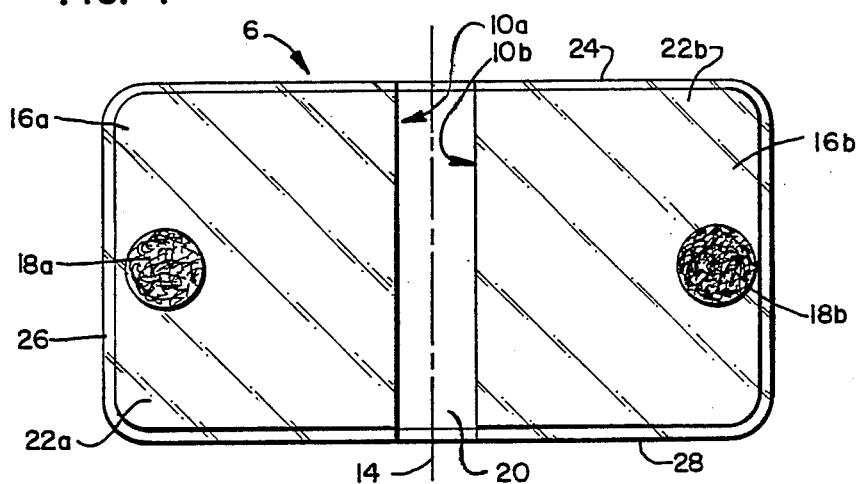
Figure 2:
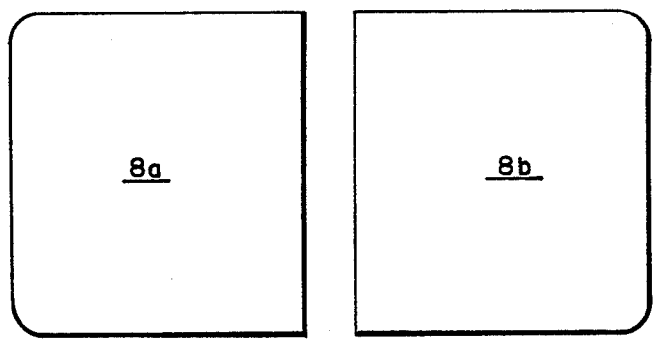
FIG. 2 is a plan view of a pair of information cards in accordance with the present invention which can be inserted into the respective pockets of the plastic holder shown in FIG. 1.
Figure 3:
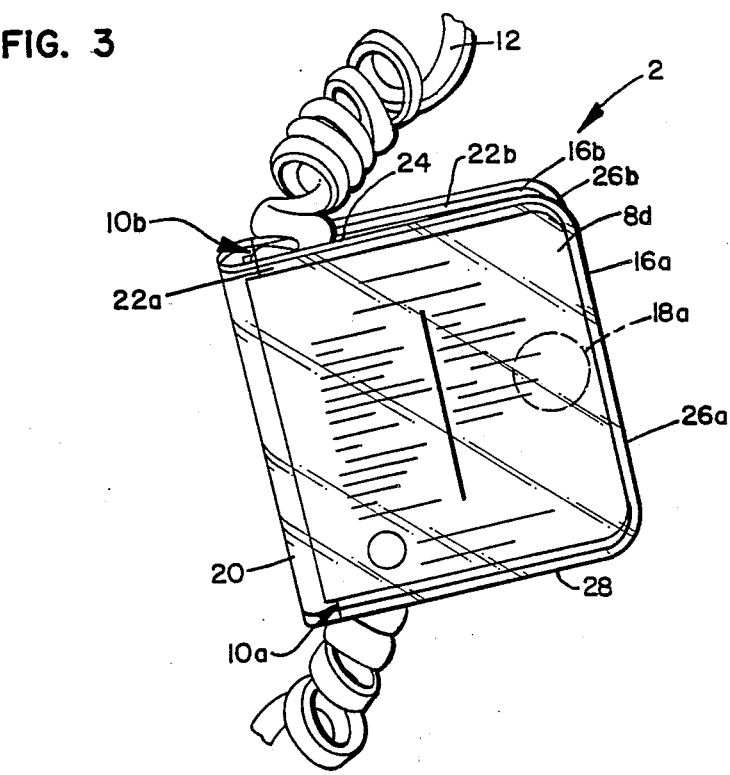
FIG. 3 is a perspective view of an attachable information booklet in accordance with the present invention when attached to a telephone cord.

Referring now to the drawings, and to FIGS. 1-3 in particular the preferred informational booklet 2 of the present invention includes a holder 6 and two information cards 8 which preferably display printed information (not shown) thereon.

The holder 6 is made of clear plastic, folded over with clear plastic pockets 10 to hold printed information cards 8. The cards 8 can be inserted into the pockets 10 of the holder 6, and the holder 6 maybe folded around an elongated cord 12 such as the telephone cord 12 shown in FIG. 3. When the holder 6 is folded generally along a center line 14, generally shown as being equal distant from the respective pockets 10 shown in FIG. 1, and the outer edges of each of the respective ends 16a and 16b of the holder 6 are roughly aligned as shown in FIG. 3, the holder 6-, is held together with Velcro buttons 18.

FIG. 1 is a drawing of the clear plastic holder 6 with the pockets 10 and the placement of the Velcro buttons 18. FIG. 8 is a drawing of the cards 8 that are to be inserted into the plastic holder 6.

Figure 4:
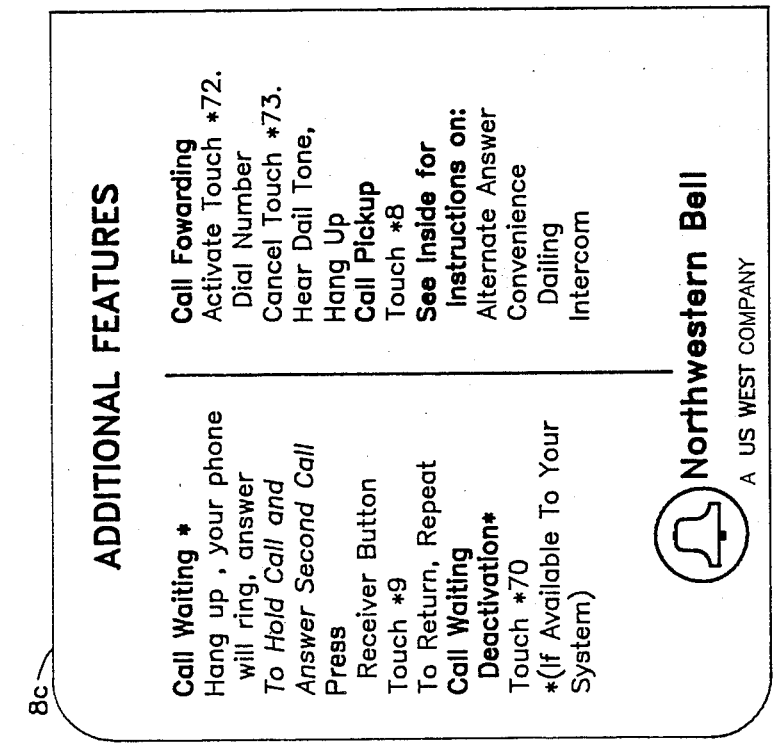
FIG. 4 is a plan view of a pair of alternate information cards similar to those shown in FIG. 2.

Referring now also to FIG. 4, which shows the printed information which appears on a pair of alternate information cards 8c and 8d, it will be appreciated that the information which can be provided to the user of a telephone, is the type of information which one only needs when one is using that particular device, and that it is important for that information to be readily available at a location near that particular device when the information is needed by the user thereof.

The preferred attachable informational booklet 2 of the present invention is attached to a telephone cord 12 as shown in FIG. 3. The holder 6 provides sufficient physical flexibility to attach itself to any location of the telephone cord 12. The holder 6 is held together around the cord 12 by reciprocating male and female Velcro ™ buttons 18a and 18b that are placed strategically so that the information cards 8 within the holder 6 will not slip down on the cord 12. The informational booklet 2 can provide up to four sides of printed information contained within the 2 plastic pockets 10. It will be appreciated that the attachable informational booklet offers the owner significant flexibility with respect to changing, altering, and updating information printed on the exchangeable and interchangeable information cards 8. Both the constant availability of the information in a location in near proximity to the functioning equipment for which the information is provided, and the flexibility to change and update this information as the need to provide new or altered information arises, are significant advantages which are presented by of the present invention.

The plastic holder 6 shown in FIGS. 1 and 3 is made from an electronic heat sealing die. This allows the two different plastics to be adhered together. The plastic holder 6 is 4 9/16" wide and $2\frac{3}{8}$" deep when lying flat. There are two pockets 10a and 10b that open to the inside of the holder 6 and are $1\frac{7}{8}$" wide and $2\frac{1}{4}$" deep. The bottom flat piece of clear plastic 20, shown in FIG. 1 is made of 10 gauge rigid polished two side clear plastic. The two pockets 10a and 10b are completed by sealing two smaller pieces 22a and 22b of 12 gauge 3H hand polished 2 side clear plastic to the bottom piece 20 which forms the outside of the plastic holder 6.

The cards 8 to be inserted are printed two-sided on 80 lb. index stock and are available in as many colors as desired. The preferred cards 8 are 1 15/16" wide×2⅛" deep.

The Velcro buttons 18a and 18b are ½" in diameter and are placed ⅞" from a top 24 of the clear plastic on the pockets 10a and 10b and 1/32" from the edge 26 nearest each respective end 16a and 16b.

The Velcro buttons 18a and 18b and the printed cards 8 in preferred embodiments will be color coordinated in the various colors desired by the customers.

The attachable informational booklet 2 of the preferred embodiment is folded in a book fashion over a telephone cord 12 so that the cord 12 runs horizontally down the spine of the inside fold. The Velcro buttons 18a and 18b are attached to the inside of the holder 6, centered from the top 24 and bottom 28. The snug fitting of the spine when folded over and attached by the Velcro buttons 18a and 18b causes enough friction to hold the attachable informational booklet 2 in place such that it resists slipping.

The plastic informational booklet 2 has two pockets 10a and 10b that open to the inside. These pockets 10a and 10b are filled with informational cards 8a and 8b which preferably have information printed on both sides. The information card 8 is designed for flexibility and can accommodate any message, advertising, or instructional information. The cards 8 are not limited in usage or color.

It is to be understood, however, that even though numerous characteristics and advantages of the present invention have been set forth in the foregoing description, together with details of the structure and function of the invention, the disclosure is illustrative only, and changes in matters of order, shape, size, and arrangement of parts may be made within the principles of the invention and to the full extent indicated by the broad general of the terms in which the appended claims are expressed.

I claim:

1. An attachable informational booklet attachable to an elongated member, said informational booklet comprising:
   (a) a plurality of information cards providing printed information;
   (b) a plastic holder including a plurality pockets for receiving and holding said information cards, said plurality of pockets including first and second pockets, information cards being located in each of said first and second pockets, said holder being foldable along hinge means for joining said first and second pockets together, the plastic holder being made of clear plastic such that printed information on either side of each of said plurality of cards can be visible through said plastic holder; and
   (c) coupling means for detachably connecting said first pocket to said second pocket, said tab means being located such that said holder can be folded and connected around the elongated member and thereby attached thereto.

2. The attachable informational booklet of claim 1 wherein said coupling means include reciprocal adhesion patches, said reciprocal adhesion patches being attached to respective pockets such that said pockets can be connected in a position remote to said hinge means and around the elongated member and thereby attached thereto, said reciprocal adhesion patches being detachably attachable to one another when forced against one another.

3. The attachable informational booklet of claim 2 further comprising a plurality of information cards providing printed information, and said plastic holder including a plurality of pockets for receiving and holding said information cards.

4. The attachable informational booklet of claim 1 where said reciprocal adhesion patches are reciprocal patches of Velcro TM adhesion material.

5. The attachable informational booklet of claim 1 wherein said plastic holder is made at least partially of clear plastic such that information printed on said information card is visible through said plastic holder.

6. An attachable informational device for displaying printed information provided on information cards, said information booklet being attachable to an elongated member, said informational device comprising:
   (a) a plastic holder including first and second pockets for receiving and holding information cards, said holder being foldable along hinge means between said first and second pockets, said holder means being of clear plastic such that printed information on both sides of information cards in said pockets can be visible through said holder; and
   (b) coupling means for detachably connecting said first and second pockets in a location remote to said hinge means such that said holder can be folded and connected around the elongated member and thereby attached thereto.

7. The attachable informational device of claim 6 wherein said coupling means includes reciprocal adhesion patches which attch to one another when forced against one another.

8. The attachable informational device of claim 7 wherein said reciprocal adhesions patches are reciprocal patches of Velcro TM adhesion material.

9. The attachable informational device of claim 6 wherein said plastic holder is made at least partially of clear plastic such that said printed information provided on said information cards is visible through said plastic holder.

10. An attachable informational device for displaying printed information presented on information cards, said booklet being attachable to an elongated member, said informational device comprising:
   (a) a plurality of plastic pocket means for holding information cards, said pocket means being made of clear plastic such that information on both sides of information cards in said pocket means can be visible through said pocket means; and
   (b) attachment means for attaching said informational device to the elongated member, said attachment means including hinge means for connecting at least a pair of said plurality of pocket means, and coupling means for detachably connecting said pair of pocket means, said coupling mean being capable of connecting said pair of pocket means in positions on each of said pair of said pocket means which are distal to said hinge means such tht said pair of pocket means can be detachably connected in a location distal to said hinge means which allow said pair of pocket means to be connected around said elongated member and thereby attached thereto.

11. The attachable informational device of claim 10 wherein said coupling means include oppositely facing adhesion patches attached to said pair of pocket means, wherein said adhesion patches detachably attached to one another when forced against one another.

12. The attachable informational device of claim 11 wherein said oppositely facing adhesion patches are reciprocal patches of Velcro ™ adhesion material.

13. The attachable informational device of claim 10 wherein each of said pocket means includes a pocket for receiving at least one information card, wherein information printed thereon is visible through said pocket means.

14. The attachable informational device of claim 13 wherein said pocket means is made at least partially of clear plastic through which said printed information is visible.

15. An attachable informational device for attachment to an elongated member, said information booklet comprising a plastic holder including pocket means for receiving and displaying printed information inserts, hinge means for foldably connecting portions of said holder such that said holder can be folded along said hinge means and around the elongated member, and attachment means for detachably attaching the portions of said holder which can be folded around the elongated member such that said holder can be attached around said elongated member.

16. The attachable information device of claim 15 wherein said attachment means include reciprocal male and female Velcro ™ tabs.

17. A method of attaching printed information to a telephone cord of a telephone in order to provide a readily available source of information for an individual using the telephone, said method comprising the steps of:
(a) providing an attachable informational device including booklet means for providing information, said booklet means including page means for displaying information, said page means including a plurality of pages, said booklet means further including hinge means for foldably connecting said plurality of pages to one another at first ends of each of said plurality of pages, and attachment means for attaching said booklet means to the telephone cord, said attachment means including coupling means for detachably connecting at least two of said pages together at locations removed from said hinge means such that at least two of said pages can be connected at locations such that said booklet means can encircle the telephone cord when said two pages are connected by said detachable coupling means;
(b) folding said booklet means at said hinge means so that said booklet means can encircle the telephone cord; and
(c) connecting said two pages with said detachable coupling means so that said booklet means defines an opening for passage of the telephone cord therethrough.

18. The method of claim 17 wherein said folding step includes folding said two pages around the telephone cord so that said two pages can be connected such that they encircle a length of the telephone cord.

19. The method of claim 17 further comprising the step of inserting the telephone cord through the opening defined by said booklet means when said pages are connected by said detachable coupling means.

* * * * *

UNITED STATES PATENT AND TRADEMARK OFFICE
CERTIFICATE OF CORRECTION

PATENT NO. : 4,856,214

DATED : August 15, 1989

INVENTOR(S) : James Allen Machen

It is certified that error appears in the above-identified patent and that said Letters Patent is hereby corrected as shown below:

ON THE TITLE PAGE:

The title, "Information Clip-It" should be changed to --Attachable Informational Booklet--.

Col. 2, line 24, "velcro" should be --Velcro$^{TM}$--.

Col. 2, line 27, "velcro" should be --Velcro$^{TM}$--.

Col. 3, line 9, "velcro" should be --Velcro$^{TM}$--.

Col. 3, line 13, "velcro" should be --Velcro$^{TM}$--.

Col. 3, line 19, "velcro" should be --Velcro$^{TM}$--.

Col. 3, line 23, "velcro" should be --Velcro$^{TM}$--.

Col. 4, line 26 & 27, after "holder" delete --means-- and after "being" insert --made--.

Col. 4, line 64, "tht" should be --that--.

Col. 1, lines 1-4, "INFORMATION CLIP-IT" should be --ATTACHABLE INFORMATIONAL BOOKLET--

Signed and Sealed this

Nineteenth Day of November, 1991

Attest:

HARRY F. MANBECK, JR.

*Attesting Officer*  *Commissioner of Patents and Trademarks*